US006565647B1

(12) United States Patent
Day et al.

(10) Patent No.: US 6,565,647 B1
(45) Date of Patent: May 20, 2003

(54) CEMENTITIOUS SHOTCRETE COMPOSITION

(75) Inventors: Wilfred J. Day, St. Alberta (CA); Richard G. Parker, Edmonton (CA); Frank M. MacNeil, St. Alberta (CA)

(73) Assignee: Shieldcrete Ltd., Alberta (CA)

( * ) Notice: Subject to any disclaimer, the term of this patent is extended or adjusted under 35 U.S.C. 154(b) by 0 days.

(21) Appl. No.: 10/171,462

(22) Filed: Jun. 13, 2002

(51) Int. Cl.[7] .............................................. C04B 22/00
(52) U.S. Cl. ...................... 106/813; 106/626; 106/713; 106/736
(58) Field of Search ................................ 106/626, 713, 106/736, 813

(56) References Cited

U.S. PATENT DOCUMENTS

| | | | |
|---|---|---|---|
| 1,576,730 A | 3/1926 | Harth | |
| 2,992,175 A | 7/1961 | Borst | |
| 3,006,777 A | 10/1961 | Atkin | |
| 4,935,060 A | * 6/1990 | Dingsoyr | .................... 106/719 |
| 5,402,455 A | 3/1995 | Angelo, II et al. | |
| 5,494,513 A | 2/1996 | Fu et al. | |
| 5,819,186 A | 10/1998 | Stephens | |
| 6,046,374 A | 4/2000 | Stephens | |
| 6,166,390 A | 12/2000 | Quapp et al. | |
| 6,264,740 B1 | * 7/2001 | McNulty, Jr. | ................ 106/817 |
| 6,465,048 B1 | * 10/2002 | Toma et al. | ................. 427/427 |

FOREIGN PATENT DOCUMENTS

| | | |
|---|---|---|
| CA | 765614 | 8/1967 |
| CA | 765765 | 8/1967 |
| CA | 2211145 | 8/1996 |
| CA | 2341206 | 3/2000 |
| CA | 2260267 | 8/2002 |

* cited by examiner

*Primary Examiner*—Paul Marcantoni
(74) *Attorney, Agent, or Firm*—Brij K. Agarwal; Eckert Seamans Cherin & Mellott, LLC

(57) ABSTRACT

A cementitious shotcrete composition comprising a blend of the following range of ingredients in the following percentages by weight:

| | |
|---|---|
| cement | 50% to 99% |
| zeolite | 0.3% to 49.3% |
| barite | 0.7% to 49.7% |

9 Claims, No Drawings

CEMENTITIOUS SHOTCRETE COMPOSITION

FIELD OF THE INVENTION

The present invention relates to an improved shotcrete formulation, for application to walls of mine tunnels and a wide range of other uses.

BACKGROUND OF THE INVENTION

Shotcrete is a mortar or concrete product which is conveyed from delivery equipment through a hose, and projected pneumatically at high velocity onto a surface. It has been used since the early 1960's to protect exposed rocks from degradation due to weathering and dedication, in addition to providing support to loosened rock blocks in broken or overstressed ground. (Earlier use of the finer aggregrate gunite gained acceptance as a sealant during the 1950's.) In the late 1970's and during the 1980's, admixtures to the cement/aggregrate mix were introduced to improve its physical properties. These admixtures included accelerators, superplacticiizers, steel fibers and latterly microsilica (silica fume). A standard shotcrete formulation currently comprises cement, silica fume, aggregrates and barite.

There are two basic shotcreting technologies: the "dry" process, in which a mixture of cement, fine and course aggregrates is pneumatically conveyed through a nozzle to a delivery hose where water is added through a water ring to the essentially dry materials; and the "wet process, in which the cement, aggregrates and water are mixed to a plastic consistency before being conveyed hydraulically to the nozzle where compressed air is added to project the wet material onto the surface.

Much of the early research into shotcrete was considered an extention of concrete technology, when mix proportions were found to be the most important aspects to be evaluated. It is generally agreed that a suitable base mix with a relatively high cement and sand content compared to conventional concrete are necessary to provide plenty of paste to act as a cushion for the larger aggregate to impact and keep rebound to a minimum. High compressive strengths, typical of shotcrete products, are also a function of the high cement contents in combination with the low water—cement ratios used: 0.3% by weight for dry shotcrete and 0.35 to 0.45% by weight for wet shotcrete.

The incorporation of silica fume to shotcrete has provided a number of benefits to both its plastic and hardened properties. Silica fume in plastic shotcrete reacts with the products of the cement/water hydration reaction to create additional cementing compounds. This process not only improves the compressive strength of the hardened product, but also increases the density. The benefits, discussed above, with regard to the use of microsilica additive to shotcrete have lead to wide industry acceptance of the product. Research carried out to evaluate the properties of a silica fume shotcrete have shown the best results are obtained when dosage rates of 8–15% silica fume by weight of cement are added to the mix. A conventional shotcrete composition is:

| | |
|---|---|
| Cement Content | 18–20% by weight of dry components |
| Silica fume | 10% by weight of cement added to mix >90% $SiO_2$ |
| Admixtures | Accelerator 2–5% by weight of cement |
| Aggregate Blend | ACl 506r-85 Table 2.1 Gradation No. 1, 2 or 3 |
| Water | 0.300% by weight for dry shotcrete 0.35–0.45% by weight for wet shotcrete |

However, silica fume, which is a byproduct of steel production, has been determined to be a carcinogen. Use of shotcrete-containing silica fume has thus been prohibited by law in certain jurisdictions.

Another ingredient of current shotcrete formulations, barite, has been found to be opaque to x-rays and gamma rays, thus proving useful in shielding against radiation from uranium and other radioactive minerals. It also provides better pumping and adhesion qualities during application of shotcrete.

Prior art references of background interest to the present invention include U.S. Pat. No. 3,006,777 of Atkin, U.S. Pat. No. 2,992,175 of Borst, U.S. Pat. No. 1,576,730 of Harth, U.S. Pat. No. 5,494,513 of Fu et al (which describes the use of large amounts of zeolite in portland cement to improve the strength and aeration qualities of lightweight concrete products), U.S. Pat. No. 5,402,455 of Angelo et al, U.S. Pat. No. 6,166,390 of Quapp et al, U.S. Pat. No. 6,046,374 of Stephens, and U.S. Pat. No. 5,819,186 of Stephens. Canadian background references of interest include Patents Nos. 773,614 of Aslam et al and 765,765 of Jackson and Canadian Patent Applications 2,260,267 (which describes a shotcrete formulation with a very high barite concentration) of Toma et al, 2,341,206 of Vanvor, and 2,211,145 of Quapp et al. It is an object of the present invention to provide an alternative composition of shotcrete that does not have carcinogenic properties such as found in conventional silica fume-containing shotcrete, while at the same time providing similar advantages of adhesiveness to surfaces and good binding found in conventional silica fume shotcrete. It is a further object of the present invention to provide a shotcrete composition that has improved radiation shielding effects over conventional barite-containing shotcrete.

SUMMARY OF THE INVENTION

In accordance with the present invention there is provided a cementitious shotcrete composition comprising a blend of the following ingredients in the following percentages by weight:

| | |
|---|---|
| cement | 50% to 99% |
| zeolite | 0.3% to 49.3% |
| barite | 0.7% to 49.7% |

In a preferred embodiment of the present invention, where the shotcrete is specifically applicable for use in shielding against radiation, the blended cememtitious shotcrete composition comprises the following ingredients in the following percentages by weight:

| | |
|---|---|
| cement | 50% to 75% |
| zeolite | 0.3% to 4% |
| barite | 49.7% to 21% |

In practice, the cementitious shotcrete composition of the present invention is preferably blended with aggregrates in a ratio range of from about 1:1 to about 1:3 by weight.

DETAILED DESCRIPTION OF THE INVENTION

The cement component of the composition according to the present invention is preferably portland cement of type 30, high early strength. It has a normal particle size of from about 5 microns to about 100 microns. The zeolite component is either preferably either a basalt zeolite or clinoptilolite of a particle size in the range of from about 5 microns to about 500 microns (minus 30 to plus 325 mesh −25% passing 325 mesh).

The shotcrete composition according to the present invention utilizes zeolite. This provides a number of additional benefits to performance. Zeolite is a naturally occurring alumino-silicate which has a porous molecular framework structure. The regularly spaced pores allow some molecules to pass into and through the crystal lattice while keeping others outside (molecular sieving). Such physio-chemical properties give zeolite cation exchange, gas absorption and water retention capabilities. Zeolites also have a large highly reactive surface area, giving them superior adsorptive qualities. The hydration and pozzolonic characteristics, combined with high surface area, impart unique cementacious qualities to zeolite powders and aggregates. Additionally zeolite selectively removes cesium (Cs134, Cs137) and strontium (Sr90) isotopes through the process of ion-exchange. The radioactive isotopes are encapsulated within the zeolite cage structure.

A typical chemical zeolite composition is:

| | |
|---|---|
| $SiO_2$ | 52.4% |
| $Al_2O_3$ | 13.13% |
| $Fe_2O_3$ | 8.94% |
| $TiO_2$ | 0.97% |
| CaO | 6.81% |
| $Na_2O$ | 2.64% |
| $K_2O$ | 0.49% |
| MgO | 4.26% |
| MnO | 0.10% |

Research carried out to evaluate the properties of zeolite shotcrete have shown the best results are obtained when zeolite is present in a weight range of about 2–19% by weight zeolite to cement.

The barite used has a particle size of from about 0.1 microns to about 100 microns, and an average particle diameter of about 26 microns and a medial particle diameter of 20.4 microns with a 200 mesh retention of 16. Its typical chemical composition is:

| | |
|---|---|
| $BaSO_4$ | 89% |
| $Fe_2O_3$ | 0.3% |
| CaO | 0.3% |
| MgO | 0.1% |
| $Al_2O_3$ | 0.63% |
| Silicates | 5.8% |

Radiation Shielding Test Results

A zeolite shotcrete composition formulated according to the present invention, has been compared with respect to gamma photon attenuation properties with conventional shotcrete, portland cement and shieldcrete. It has been found that with the combination of barite and zeolite, enhanced radiation protection is provided over what is provided by using barite alone, because of the isotope encapsulation abilities of zeolite.

The following parameters were used to derive the thickness of portland cement (conventional) shotcrete and zeolite shotcrete (in accordance with the present invention) required to reduce radiation intensity. For comparison purposes, gamma photon intensity reduction is reported as a percent reduction to demonstrate the degree of gamma photon attenuation for portland cement, shotcrete and zeolite shotcrete (of the present invention). The following densities have been used for portland cement, shotcrete and zeolite shotcrete:

| | |
|---|---|
| Portland cement | 2.35 g/cm³ |
| Regular shotcrete | 2.21 g/cm³ |
| Zeolite shotcrete | 2.69 g/cm³ |

The 2.45 MeV mass attenuation, linear absorption coefficients and half value layers for the above shielding mediums are as follows:

| | |
|---|---|
| Portland cement | |
| Mass attenuation coefficient | 0.0411 cm²/g |
| Linear absorption coefficient | 0.0966 cm⁻¹ |
| Half value layer (HVL) | 7.17 cm |
| Regular shotcrete | |
| Mass attenuation coefficient | 0.0411 cm²/g |
| Liner absorption coefficient | 0.0908 cm |
| Half value layer (HVL) | 7.63 cm |
| Zeolite shotcrete | |
| Mass attenuation coefficient | 0.0415 cm²/g |
| Linear absorption coefficient | 0.1106 cm |
| Half value layer (HVL) | 6.27 cm |

Gamma photon attenuation comparisons Table 1 describes the thickness of regular shotcrete, Portland cement and Zeolite shotcrete required to reduce original gamma photon intensity by 10 to 90 percent using the following equation.

$$I = I_o e^{-\mu t}$$

Where:

$I_o$=the original gamma photon intensity (100%)
I=the required percent reduction
e=natural logarithm 2.718
$-\mu t$=.−(0.693/HVL)×thickness of the absorber in centimeters

TABLE 1

Thickness of Shotcrete, Portland cement and Shieldcrete required to reduce gamma photon intensity (% reduction).

| % Reduction | Shotcrete | Portland Cement | Zeolite Shotcrete |
|---|---|---|---|
| 10 | 1.15 cm | 1.09 cm | 0.95 cm |
| 20 | 2.43 cm | 2.31 cm | 2.02 cm |
| 30 | 3.89 cm | 3.69 cm | 3.23 cm |
| 40 | 5.57 cm | 5.29 cm | 4.62 cm |
| 50 | 7.56 cm | 7.17 cm | 6.27 cm |
| 60 | 10.0 cm | 9.48 cm | 8.29 cm |
| 70 | 13.13 cm | 12.46 cm | 10.89 cm |
| 80 | 17.56 cm | 16.65 cm | 14.56 cm |
| 90 | 25.12 cm | 23.82 cm | 20.83 cm |

Table 1 describes the thickness of regular shotcrete, portland cement and zeolite shortcrete required to reduce original gamma photon intensity by 10 to 90 percent using the following equation:

$$I = I_o B e^{\mu t}$$

Where

B = Build-up factor. Build-up factors take into account the fact that not all gamma photon interactions with the absorber are removed by the absorber. For example, the photon energies resulting from Compton Scattering and pair production interactions can result. With increasing absorber thickness these secondary photons can be scattered which, in turn, can result in higher gamma radiation intensities at the exterior surface of the absorber or shield.

Table 2 describes the impact on shielding thickness when the buildup factor for regular shotcrete, portland cement and zeolite shotcrete is taken into account.

TABLE 2

Thickness of Shotcrete, Portland cement and Shieldcrete required to address the buildup factor.

| % Reduction | Buildup Factor | Shotcrete | Portland Cement | Zeolite Shotcrete |
|---|---|---|---|---|
| 10 | <0.1 | 1.15 cm | 1.09 cm | 0.95 cm |
| 20 | 0.19 | 2.43 cm | 2.31 cm | 2.02 cm |
| 30 | 0.37 | 3.89 cm | 3.69 cm | 3.23 cm |
| 40 | 0.56 | 5.57 cm | 5.29 cm | 4.62 cm |
| 50 | 0.72 | 7.56 cm | 7.17 cm | 6.29 cm |
| 60 | 0.92 | 10.0 cm | 9.48 cm | 8.29 cm |
| 70 | 1.29 | 10.06 cm | 15.09 cm | 13.20 cm |
| 80 | 1.65 | 23.23 cm | 21.83 cm | 19.09 cm |
| 90 | 1.92 | 32.53 cm | 30.57 cm | 26.74 cm |

The data reported in Tables 1 and 2 clearly demonstrate that gamma photon intensity is reduced as the density of the absorber is increased. According to the data from Tables 1 and 2 the amount of zeolite shotcrete required to achieve the same shielding objective provided by regular shotcrete is reduced by eighteen percent. It should, however, be noted that exponential attenuation used for these calculations only applies for thin absorbers. This is due to the assumption that all photon interactions regardless of photon energy are completely stopped by the absorber. While this assumption will be true for photoelectric interactions it cannot be used for the higher energy gamma photons that result in Compton and pair production interactions. For example, the Exponential Attenuation Law for photons will not completely reduce the gamma photon as the Law suggests. Table 3 describes the percent reduction achieved using the exponential attenuation law and the increase in shielding required to compensate for reduced attenuation.

TABLE 3

Thickness of Shotcrete, Portland cement and Zeolite shotcrete required to compensate for reduced gamma photon attenuation when the Exponential Attenuation Law is employed.

| % Reduction | Shotcrete | Portland Cement | Zeolite Shotcrete |
|---|---|---|---|
| 10 | 2.21 cm | 2.1 cm | 1.81 cm |
| 20 | 4.47 cm | 4.20 cm | 3.67 cm |
| 30 | 6.77 cm | 6.41 cm | 5.60 cm |
| 40 | 9.25 cm | 8.77 cm | 7.66 cm |
| 50 | 12.01 cm | 11.37 cm | 9.93 cm |
| 60 | 15.16 cm | 14.35 cm | 12.53 cm |
| 70 | 18.93 cm | 17.96 cm | 15.68 cm |
| 80 | 24.02 cm | 22.75 cm | 19.87 cm |
| 90 | 32.20 cm | 30.48 cm | 26.62 cm |

CONCLUSION

The density for zeolite shotcrete clearly demonstrates its superiority over regular shotcrete as a gamma photon absorber. Since the primary role of shotcrete is to provide structural support to exposed rock, the gamma photon attenuation properties of shieldcrete provide an additional dimension when radiation dose control is a safety issue. As well, because of the superior radiation shielding (reduction) qualities of zeolite shotcrete, significant reduction in the amount of zeolite shotcrete used, when compared to conventional shotcrete formulations, to achieve similar radiation shielding effects, can be achieved. This may be as much as an 18% saving in shotcrete material.

Thus, there has been provided in accordance with the invention a cementitious shotcrete composition that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What we claim as our invention:

1. A cementitious shotcrete composition comprising a blend of the following range of ingredients in the following percentages by weight:

| | |
|---|---|
| cement | 50% to 99% |
| zeolite | 0.3% to 49.3% |
| barite | 0.7% to 49.7%. |

2. A shotcrete composition according to claim 1 wherein the ingredients are present in the following percentages by weight:

| | |
|---|---|
| cement | 50% to 75% |
| zeolite | 0.3% to 4% |
| barite | 49.7% to 21% |

3. A shotcrete composition according to claim 1, wherein the cement is portland cement.

4. A shotcrete composition according to claim 1, wherein zeolite is selected from the group consisting of the basalt zeolite and clinoptilolite.

5. A shotcrete composition according to claim 1, wherein the zeolite is made up of the following components in the following approximate percentages by weight

| | |
|---|---|
| $SiO_2$ | 52.4% |
| $Al_2O_3$ | 13.13% |
| $Fe_2O_3$ | 8.94% |
| $TiO_2$ | 0.97% |
| CaO | 6.81% |
| $Na_2O$ | 2.64% |
| $K_2O$ | 0.49% |
| MgO | 4.26% |
| MnO | 0.10% |

6. A shotcrete composition according to claim 1, wherein barite is made up of the following components in the following approximate percentages by weight:

| | |
|---|---|
| $BaSO_4$ | 89% |
| $Fe_2O_3$ | 0.3% |
| CaO | 0.3% |
| MgO | 0.1% |
| $Al_2O_3$ | 0.63% |
| Silicates | 5.8% |

7. A shotcrete composition according to claim 2, wherein the cement is portland cement, the zeolite is made up of the following components and the following approximate percentages by weight:

| | |
|---|---|
| $SiO_2$ | 52.4% |
| $Al_2O_3$ | 13.13% |
| $Fe_2O_3$ | 8.94% |
| $TiO_2$ | 0.97% |
| CaO | 6.81% |
| $Na_2O$ | 2.64% |
| $K_2O$ | 0.49% |
| MgO | 4.26% |
| MnO | 0.10% |

8. A shotcrete composition according to claim 1 wherein the particle size of the ingredients are as follows:

| | |
|---|---|
| cement | about 5 microns to about 100 microns |
| zeolite | about 5 microns to about 500 microns |
| barite | about 0.1 microns to about 100 microns |

9. A shotcrete composition according to claim 1 blended with aggregates in a ratio range from about 1:1 to about 1:3 by weight.

\* \* \* \* \*